Figure 1:
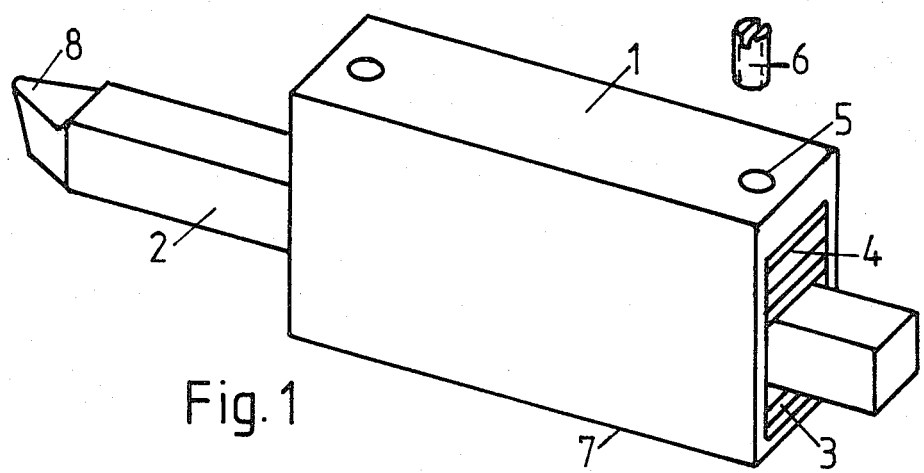

United States Patent [19]

Müntel

[11] Patent Number: 4,530,263
[45] Date of Patent: Jul. 23, 1985

[54] HOLDER AND ATTACHMENT FOR LATHE TOOLS

[76] Inventor: Bruno Müntel, Hoiersdorfer Str. 4, Schöningen, D - 3338, Fed. Rep. of Germany

[21] Appl. No.: 555,878

[22] PCT Filed: Mar. 8, 1983

[86] PCT No.: PCT/DE83/00039
§ 371 Date: Nov. 9, 1983
§ 102(e) Date: Nov. 9, 1983

[87] PCT Pub. No.: WO83/03215
PCT Pub. Date: Sep. 29, 1983

[30] Foreign Application Priority Data

Sep. 22, 1983 [DE] Fed. Rep. of Germany ....... 3208923

[51] Int. Cl.³ .................. B23B 29/22; B23B 29/28
[52] U.S. Cl. .................................. 82/36 R; 82/37; 407/69; 407/77; 407/85; 407/101
[58] Field of Search .............. 82/36 R, 37; 407/99, 407/70, 71, 72, 68, 112, 77, 101, 69

[56] References Cited

U.S. PATENT DOCUMENTS

| 302,496 | 7/1884 | Johnson | 407/67 |
| 383,103 | 5/1888 | Cook | 407/72 |
| 2,418,734 | 4/1947 | Steffes | 407/99 |
| 2,710,442 | 6/1955 | Ranous | 407/85 |
| 3,785,021 | 1/1974 | Norgren | 407/72 |

FOREIGN PATENT DOCUMENTS

| 1237216 | 7/1960 | France | 82/37 |
| 176675 | 3/1922 | United Kingdom | 407/69 |

Primary Examiner—Leonidas Vlachos
Attorney, Agent, or Firm—Collard, Roe & Galgano

[57] ABSTRACT

A holder for lathe tools having an elongated sleeve for receiving a tool shank and a plurality of shims for fixing the height of the shank in the sleeve. At least a portion of one wall of the sleeve is made of a ferromagnetic material. The holder also includes a clamping head, for clamping the sleeve onto a lathe support, that has a wall that slidably engages the sleeve wall. This clamping head wall has a magnet mounted flush within its surface for engagement with the ferromagnetic portion of the sleeve wall so as to ensure contact between the wall of the sleeve and the clamping head wall. Also disclosed is a holder spreading device for use with the holder.

9 Claims, 7 Drawing Figures

HOLDER AND ATTACHMENT FOR LATHE TOOLS

The invention relates to the fixing and attachment for lathe tools, especially in customary lead screw and draw spindle lathes.

The setting up of the tools in such lathes, namely the height adjustment of the cutting edges and the alignment of the chip-removing tools such as turning tools, boring bars and the like and also the alignment of not-chip removing tools such as knurling tools or embossing rolls had to be done heretofore directly at the shut-down machine itself by skilled labor with high costs in time. The shut-down times and the set-up time counted the more, the smaller the quantity to be produced, and reached a maximum in making single pieces, for instance, in toolmaking. The effect was especially detrimental if several tool changes were necessary in machining a workpiece. Economical production of small lots could hardly be considered. Only the use of turret lathes or screw machines was available, in which all tools were rigidly set up and switched into the operating position sequentially. With these machines, the absolute setup times are considerably longer than the setup and changeover in the conventional slide lathes; but the changeover times are reduced to seconds and the shut-down times of the machine during changeover are eliminated entirely. The prorated setup costs, however, are distributed over large quantities and the labor costs are reduced considerably because semiskilled personnel can be used for operating the turret lathes, and the operation of screw machines is limited to the supervision of several machines. If small lots of screw machine parts have to be made regularly on turret lathes, for instance, spare parts, it is possible, of course, to store the equipped turrets and to use them directly when required, and to thereby save a complete new setup; this is balanced, however, by higher investment costs. In addition, it is assumed that the shop has these machines available at all.

The center of gravity of setting-up in the customary slide lathe is the height adjustment of the cutting edge of the chip-removing tool or the knurling roll fork or the embossing or flanging roll holder. To this end, the square shanks of the turning tools or holders are placed with shims on the support and are aligned until the required height is reached, are then aligned in the horizontal plane and are clamped together by means of nuts and wrenches. The number and thickness of the shims determine the height of the cutting edges or tools. In changing tools, the adjustment is lost with the exception of the height dimension, assuming that the stack of shims is stored with the tool unchanged. Tools such as this, for instance, boring rods with circular shank cross section can be fastened here with the aid of a pair of V-blocks. However, this facilitates and speeds up the setting-up and resetting of the lathe only slightly; also, remeasuring of the setting at the machine can hardly be dispensed with. It is an object of the invention to keep the tool and the shims together captive and preset outside of the lathe with respect to the height and other adjustments in a preferably uniform setting in such a manner that they can be placed on the support by a uniform receiving and clamping fixture in an exactly reproducible manner, and exchanged.

The purpose is:

the adjustment and setting-up proper of the tools are or can be separated from the lathe physically and timewise;

the entire set of fittings intended for the lathe or the set of tools provided for a given part to be made needs to be set up only once and can be stored for future or repeated requirements;

the lathe operator himself is not bothered by any setup work so that hardly any machine shut-down times occur;

the number of tool changes is practically unlimited as compared to turret lathes; in spite of this, the tool change can be accelerated by fast-acting clamping devices, so that changing speeds are obtained which are comparable to those of turret lathes;

by suitable design of the fast-acting clamping device, the possibility is preserved to change and clamp simultaneously two to four tools and to thereby achieve a further increase in performance;

tools which are no longer needed or not for an extended period of time, can be taken apart in order to limit keeping setups in stock.

The broad spectrum of possible uses of the invention can be explained most effectively by the example of a universal lathe; it makes it possible for the owner of such machines, among other things, to increase the effectiveness of his machines in a degree which is otherwise offered only by expensive special machines. Besides the use and adaptation of the corresponding auxiliary fixtures such as measuring devices, tool grinding machines, etc., the invention can also offer advantages if applied to other metal-working machines such as planers if such machines are equipped with interchangeable tools. This multi-faceted problem is solved by the invention in a surprisingly simple and inexpensive manner by a holder which consists of a rectangular sleeve which is open on the vertical small sides, can be clamped to the machine support and the inside cross section of which, standing on edge in the operating position, serves for receiving the tool shank and the stack shims required for the height adjustment and complete filling, and a device for clamping the adjusted sleeve content to the sleeve of the holder. Advantageously, the shims fill the full length and width of the inside cross section. The clamping device is preferably formed by the side walls which are elastically expandable due to longitudinal slots. Advantageously, each side is given a pair of parallel slots, each of which is open toward one end face. The slots are advantageously oriented at an acute angle to the shim edges. On both sides of the pairs of slots, holes are arranged in the clamping direction for the engagement of the posts of a spreading tool. Preferably, a spreading tool is used, the posts of which can be spread apart by means of a screw spindle, and the posts as well as the holes are of conical shape in a direction opposed to the pull-out direction in order to prevent them from sliding off.

The new holder can be used to particular advantage in conjunction with a holder which consists of a fast-action T-shaped clamping head which can be slipped on the support arbor, with support edges on both sides in the plane of symmetry of two tool sleeves, the vertical bridge surfaces of which are equipped with magnets for contact of the sleeve side walls with these surfaces. Stops for the front or back side of the sleeve holder can serve for fixing the holder in the longitudinal direction.

Several embodiment examples are shown in the drawings; in detail

Figure 2:
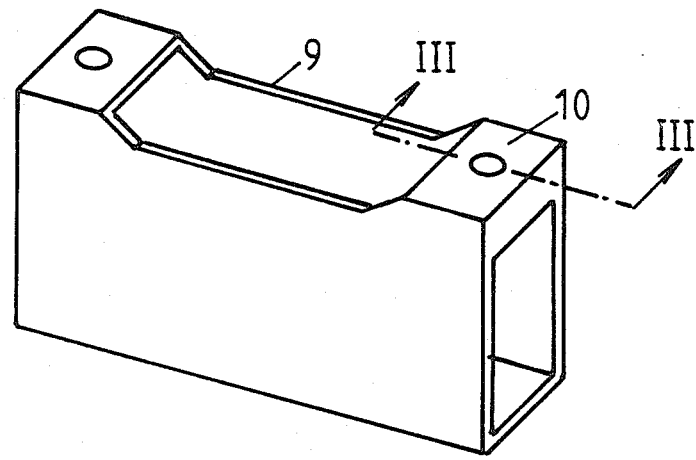
Figure 3:
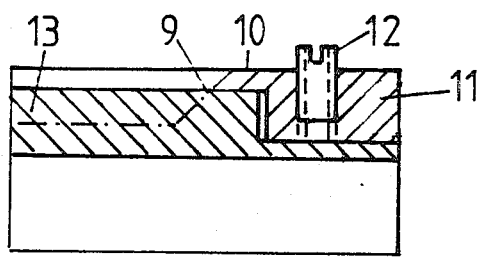
Figure 3:
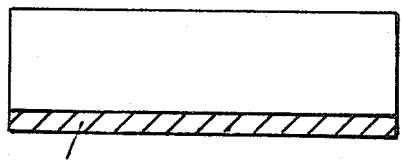
Figure 7:
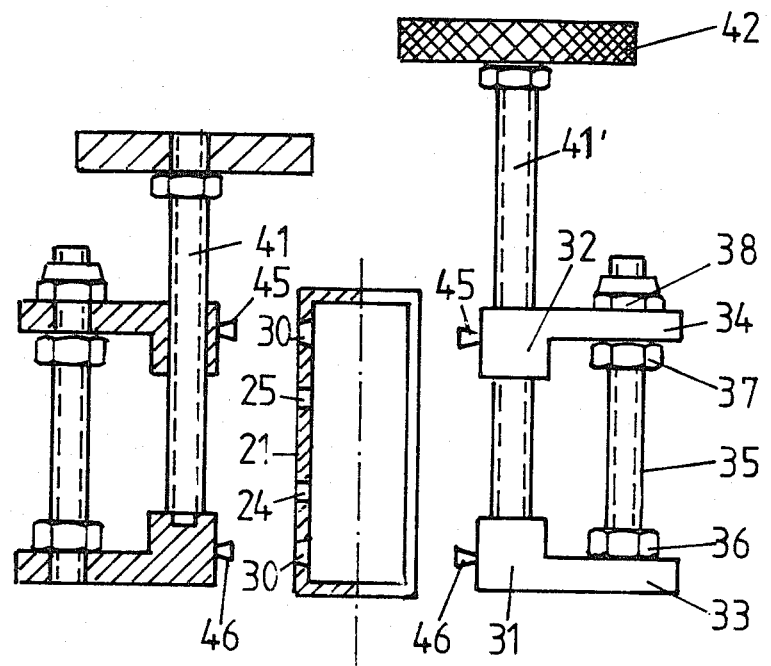
Figure 4:
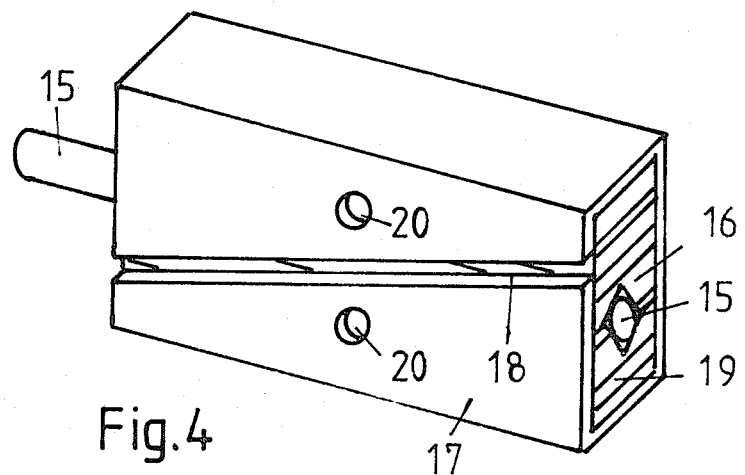
Figure 5:
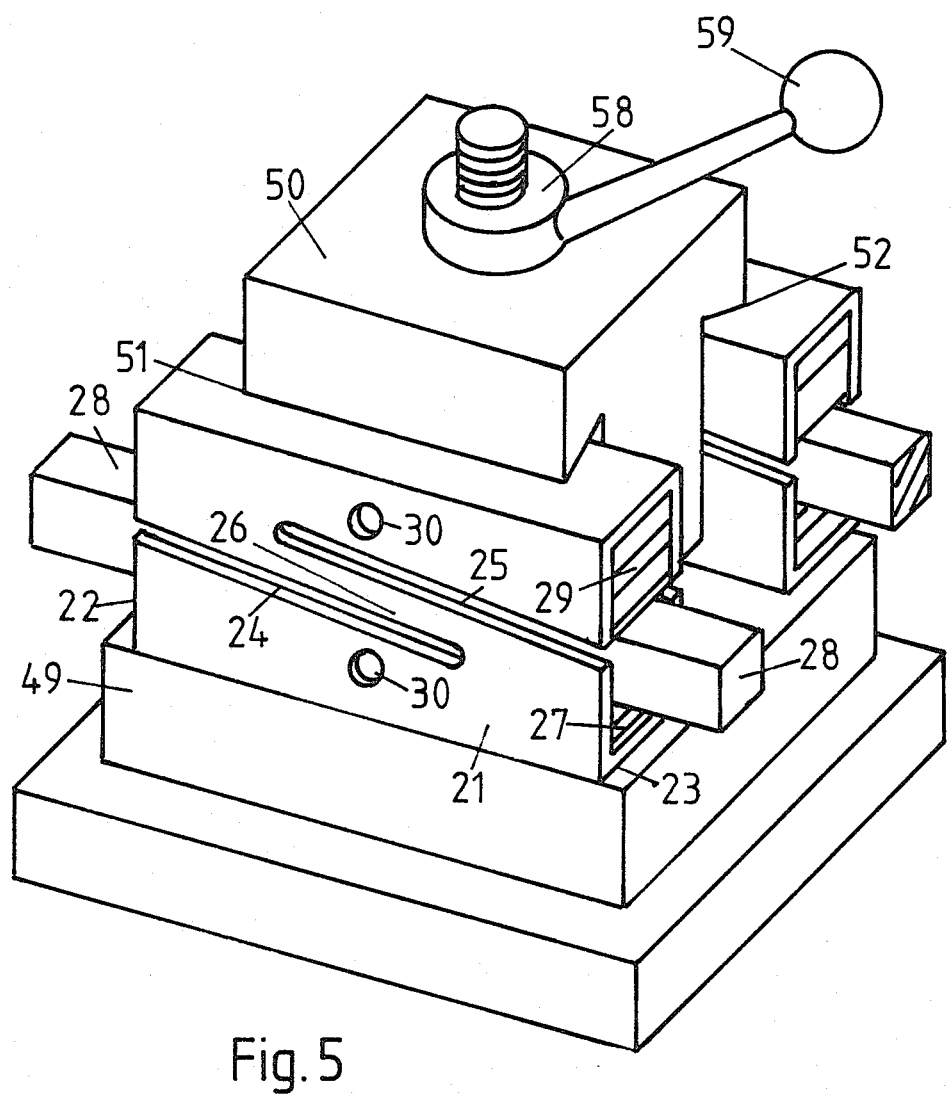
Figure 6:
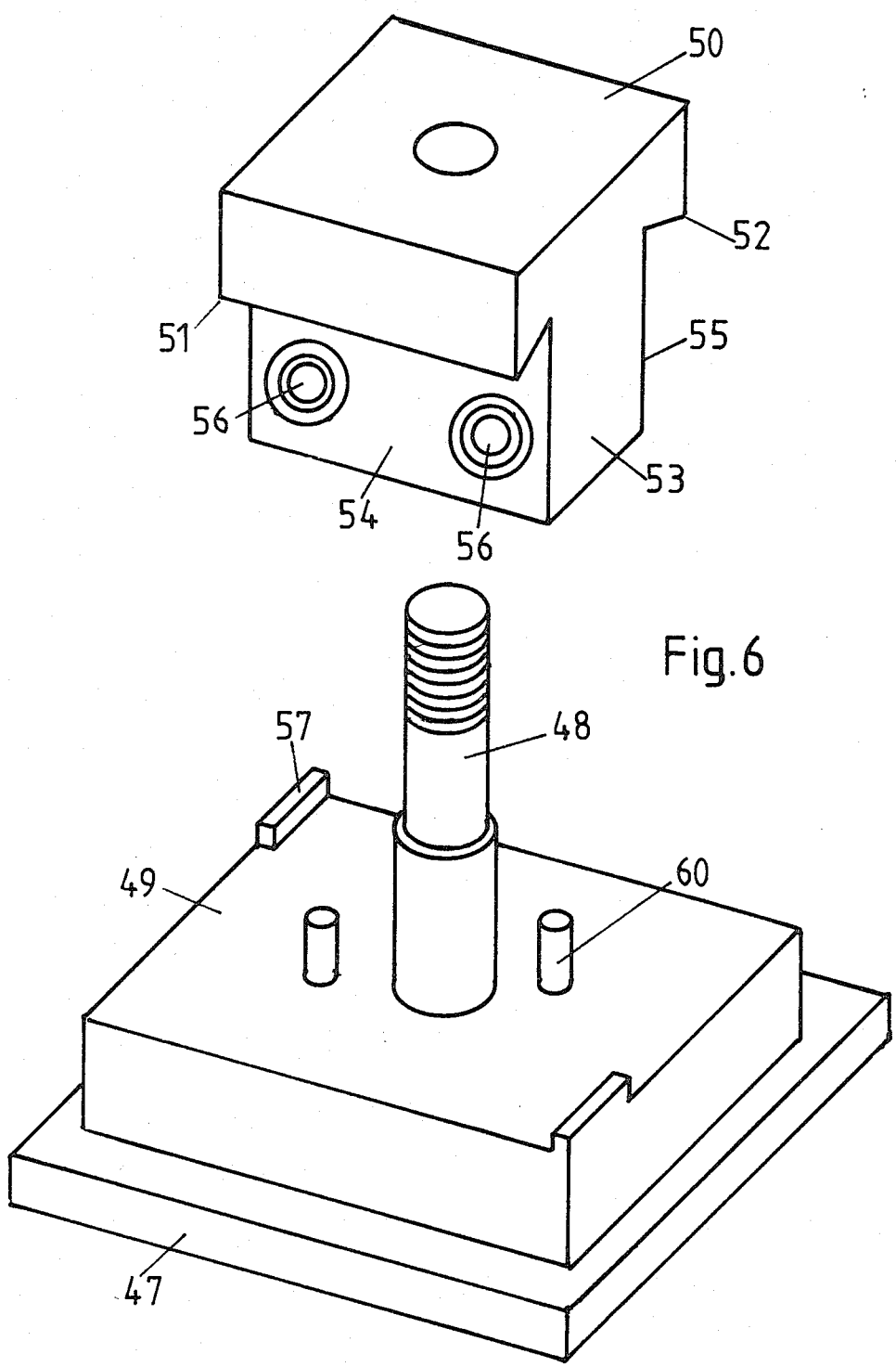

FIG. 1, in a perspective view, shows a holder equipped with a tool, with a screw clamp, FIG. 2, likewise a holder with direct engagement of the machine clamping head with the tool, FIG. 3, an enlarged cross section in the plane III—III of FIG. 2, FIG. 4, a holder without loose clamping elements, equipped with a round-shank tool, FIG. 5, a holder without loose clamping elements with symmetrical clamping in connection with the support clamping head, FIG. 6, a perspective view of the support clamping unit, and FIG. 7, a cross section and a view of a spreading vise in connection with a holder according to FIG. 4 or 5.

The new tool holder is a rectangular sleeve 1, open at both ends, with rectangular inside cross section, the width of which must exceed the shank width of the largest tool of interest. Into this sleeve 1 are inserted the tool shank 2 and the shims 3 and the cavity above the tool 2 is filled with further plates 4; the plates (shims) 3 and 4, should fill the sleeve 1 over the full length and width. The entire stack is then clamped by the screws 6 which are inserted into the tapped holes 5. The length of the worm screws 6 is designed so that they disappear entirely in the holes. The holder of sleeve 1 with the tool 2 can then be handled like a shank tool, i.e., it can be clamped to the support of a lathe; however, the height adjustment of the tool is not destroyed upon disassembly as long as the tool remains in the sleeve 1. The tool can remain in the holder sleeve also for re-grinding. If a height change is expected in regrinding, this can be taken into consideration by inserting another shim strip. In this embodiment, the entire tool/shim stack 2, 3, 4 is held together by the screws 6. The force of the support clamping device is transmitted directly to the support plate by the holder 1.

In the embodiment according to FIG. 2, the surface of the holder sleeve is provided with an interruption 9, whereby the support tension acts directly on the tool/-shim stack. The ends 11 of the upper wall 10 are enlarged in consideration of a sufficient screwing-in depth of the screws 12; also the upper shim 13 is reinforced in the middle and is made flat at the ends with the screws, so that the surface of the shim 13 is almost flush with the surface of the sleeve. This design permits the use of thin wall material for the holder because the side walls are not stressed, but rather the clamping force is transmitted directly to the bottom 12 via the tool/shim stack.

FIG. 4 shows an embodiment without additional loose parts such as the screws in FIG. 1 to 3. Additionally, the clamping of a round tool shank 15 in the known manner by means of a pair of V-blocks is shown. In this solution, the one side wall 17 is cut apart by means of a continuous slot. The slot 18 is advantageously taken at an angle, i.e., approximately diagonally, in order to prevent thin shims 19 from slipping out. For insertion, the slot 18 of this holder, which may likewise consist of thin-wall material must be spread apart. After the tool shim packet 15, 16, 19 is inserted, the spreading is cancelled, whereby the holder springs back and holds the packet. Here, too, the clamping force on the support acts directly on the stack and compresses the latter additionally. The spreading can advantageously be accomplished by a screw clamp with two pins which are inserted into the holes 20 on both sides of the slot 18, or by the fixture described below.

In FIG. 5, a further embodiment of the holder together with a support clamping head is shown in which a completely symmetrical widening of the holder in height and uniform tension are achieved. The side walls 21 are provided with inclined pairs of slots 24, 25, which are open at the end faces, 22, 23, are not continuous and extend approximately over two-thirds of the wall lengths; the land of material 26 between the slots 24, 25 acts like a spring clamped on both sides and, in spite of its small thickness of the side walls 21 allows the generation of a large clamping force for compressing the tool-shim stack in the holder. The holes 30 above and below the pair of slots 24, 25 allow the application of a spreading device for preparing an effortless removal or insertion of the stack 27, 28, 29. Since the widening excursion of the holder is only a few tenths of a millimeter, the elastic limit is not exceeded when the land between the pair of slots is bent.

Incidentally, this clamping force need only be large enough so that a firm hold between the tool 28, the shims 27 and 29 and the holder sleeve 21 is durably ensured because the operational clamping is supplied by the support clamping device.

The large and reliable parallel clamping force of the holder also allows the secure holding of tool shanks which are substantially shorter than the holder; this also provides the possibility to accommodate simultaneously two tools securely in one holder and to save holders in this manner, or to accelerate tool changes on the machine.

In FIG. 7, a holder spreading device is shown. Two heads 31, 32 with flanges 33, 34 are connected to each other by a screw spindle 35. The spindle 35 is screwed with the one end into the flange 33 and secured by the nut 36; the other flange 34 is slipped onto the spindle 35 with a drill hole. By means of the nuts 37, 38, the distance between the two flanges 33, 34 can be adjusted firmly. The heads 33, 34 carry pins 39, 40 which can be inserted into the holes 20, 30 of the holders. A further screw spindle 41 with a turning knob 42 is screwed through a tapped hole 43 of the upper head 32 and is supported by its post 44 on the lower head 31. After the nuts 37, 38 are loosened, the device is adjusted so that the posts 45, 46 have exactly the center distance of the pairs of holes 20, 30; then the nuts are tightened again. If the device with the posts 44, 45 is inserted into the holes 20 and 30, respectively, the desired spreading can be achieved by turning the spindle knob 42, i.e., the holder can be widened. After the work on the holder sleeve, the spindle knob 42 is turned back and the spreading device is removed. In the design described, the spindle 35 is subjected to a bending stress if clamping is applied; this has the advantage that it is easier to adjust the exact spacing of the posts during insertion and removal.

If this tensioning device is applied to the holder according to FIG. 5, which is slotted on both sides, two identical devices are required which, however, must be set to the holder sleeve in such a way that they do not interfere with the mounting of a surface plate. For this reason, the spindle 41 of the device is extended so far that the operation of the two knobs 42 is not impeded.

The posts 45, 46 are preferably conical with the larger diameter pointing outward in order to prevent them from sliding off during the tightening; even greater safety is achieved if the holes 20, 30 are conically expanded inward.

The properties of the uniform holder designed according to the invention can be fully exploited if they are combined with a fast-action support clamping head which is matched to the holder. One embodiment of such a fast-action clamping device which allows to accept two holders simultaneously, is shown in FIGS. 5 and 6. It consists essentially of a T-shaped clamping head 50 which can be slipped onto the support arbor 48 of the lathe. The lower outer edges of the flange are undercut, so that two long parallel support edges 51, 52 are formed. The length of the head and of the support edges is independent of the length of the holders to be clamped. The clamping itself is accomplished by the arbor nut 58 which is connected to the handle 59. In this manner, the holders can be clamped securely without damaging their surface. The security of the clamping is not affected adversely also if thinner or thicker holder sleeves are used and if the support edges 51, 52 do not rest on the holder sleeves in the symmetry plane.

The lateral land surfaces 54, 55 of the head 50 are equipped with permanent or electromagnets in order to secure the contact of the holder walls, for instance, with countersunk cup magnets 56 which are designed so that the tool holders stick to the land areas 54, 55 but can slide down onto the support plate 49 under their own weight and can also be shifted horizontally by hand. If the head 50 is moved during clamping or unclamping, the position of the holders remains unaffected in this manner.

Between the support plate 49 and the clamping head 40, a compression coil spring can be slipped on the arbor 48; upon loosening, it lifts the clamping head so far that free access to the holders is provided.

A plate 49 can also be slipped onto the arbor 48 to serve as the clamping plate proper and carries guide pins 60 which prevent mutual rotation of the clamping head 50 and the plate 49. After the clamping nut 58 is loosened, the clamping head 50 can be turned with the tools and the plate 49 about the arbor without influencing the position of the tools.

Overall, always only one clamping lever 59 needs to be operated.

Additional fixed or interchangeable stops 57 can further be arranged at the support plate 49 in order to secure the tool holders in the longitudinal direction.

The head 50 can also be guided within certain limits on the arbor 48 in a reciprocating manner with play; in this case the lower contact surface of the clamping nut 58 is made convex; thereby, height differences of the two holders can be equalized automatically without adversely affecting the firmness of the clamping.

I claim:

1. A holder for lathe tools, comprising:
   an elongated sleeve receiving a tool shank and plurality of shims fixing the height of the tool shank within said sleeve, said sleeve having at least one wall, a portion of which is made of a ferromagnetic material;
   clamping means securing the tool shank and the plurality of shims within said sleeve; and
   a clamping head to mount said sleeve onto a lathe support, said clamping head having a wall slidably engageable with said sleeve wall and having a magnet mounted therein flush with the surface thereof and disposed for engagement with said ferromagnetic portion of said sleeve wall so as to ensure contact between said walls and means clamping said sleeve to said clamping head.

2. The holder according to claim 1, wherein said sleeve is rectangular and is composed of a top plate, a bottom plate and two sidewalls, each of which join an opposite side of said top plate to an opposite side of said bottom plate, at least one of said sidewalls comprising said at least one wall having a portion which is made of said ferromagnetic material, and wherein said clamping means comprises a screw member theadably receivable within said top plate.

3. The holder according to claim 2, wherein said sleeve sidewalls each have a pair of spaced-apart generally longitudinally-extending slots found therein which define therebetween a spring-like sidewall segment which serves to render said sleeve resilient whereby said sleeve exhibits a self-clamping effect upon the shims and a plate tool received within said sleeve.

4. The holder according to claim 3, wherein each said pair of slots comprise a pair of generally parallel slots, either of which opens onto an opposite end of said sidewall with which it is associated.

5. The holder according to claim 3, wherein said pair of slots are oriented at acute angles to the longitudinal axis of said sleeve.

6. The holder according to claim 1, wherein said clamping head sleeve is T-shaped.

7. The holder according to claim 3, wherein said sidewalls of said sleeve have a pair of openings formed therein.

8. The holder according to claim 7, further comprising a holder spreading device, which comprises:
   a spindle;
   a pair or clamping jaws adjustably mounted on said spindle, each of said clamping jaws having a post insertable within one of said openings of said sleeve; and
   means for adjusting the spacing between said pair of clamping jaws.

9. The holder according to claim 8, wherein said pair of openings and said posts are conically-shaped so that said engagement of said openings and said posts is more secure.

* * * * *